Patented Mar. 13, 1934

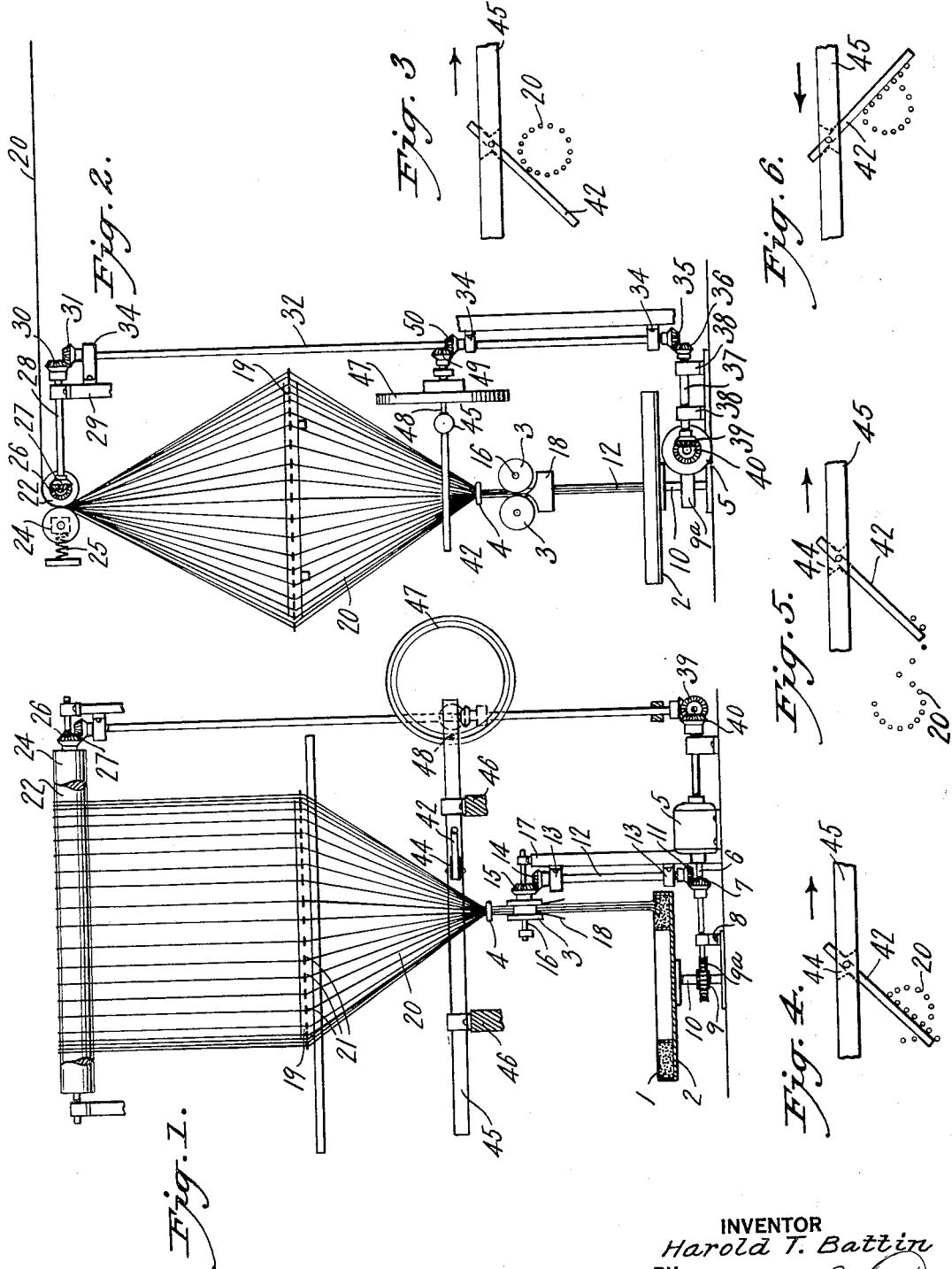

1,951,181

UNITED STATES PATENT OFFICE 1,951,181

METHOD AND APPARATUS FOR SEPARATING THE INDIVIDUAL STRANDS OF A ROPE

Harold T. Battin, Ridgewood, N. J., assignor to Revere Rubber Company, Providence, R. I., a corporation of Rhode Island Application August 9, 1930, Serial No. 474,277

15 Claims. (Cl. 18—8)

My invention relates to methods and apparatus for separating the individual strands of a rope, and more particularly to methods and apparatus for separating the strands of a rope of resilient material, such as rubber or rubber composition, which strands have a tendency to cohere.

In the patent to Hopkinson and Gibbons No. 1,545,257, issued July 7, 1925, there is shown and described a method of forming continuous rubber strands or threads directly from latex or latex composition. In handling such threads, it is sometimes desired to gather the threads into a rope and coil the rope for the purpose of curing and/or vulcanizing the strands. It thus becomes necessary to separate the individual strands before they can be spooled individually. Owing to the drying and/or vulcanizing operation to which the rope has been subjected, the individual strands have a tendency to cohere and offer considerable resistance to separation.

I provide a method and apparatus by which strands of a rope can be separated by the application of an intermittent tension in excess of the tension required for moving the strands from a rope end to rolls and/or spools. This feature is particularly useful in separating rubber or rubber composition strands as the intermittently applied excess tension first elongates the strands and then permits them to snap back to a condition corresponding to the tension placed upon them to cause movement. The stretching and snapping operation results in a vibration of the strands which tends to break down the cohesion therebetween. It is to be understood that certain features of the invention may be applicable to the separation of strands of ropes other than rubber or rubber composition.

In carrying out the invention, I provide feeding and guiding mechanism for a rope. A spreader is provided with individual guiding means for the several strands of the rope after they leave the guiding means for the rope so that each strand tends to separate and have a uniform tension placed thereon. Between the rope end and the spreader I provide a member having harmonic motion carrying a pivotally mounted arm which engages, deflects and tensions each of the separate strands during their movement toward the spreader. The movement of the arm is such that the individual strands slide along its surface and escape over its end thereby suddenly releasing them from the excess tension and permitting them to return to their natural position in the cone formed between the rope end and the separator.

The accompanying drawing illustrates a present preferred embodiment of apparatus for practicing the invention, in which:

Figure 1 is a diagrammatic front elevational view, partially in section, of appaartus for separating the individual strands of a rope;

Fig. 2 is a side elevational view of the apparatus;

Figs. 3, 4 and 5 are diagrammatic views illustrating the manner in which the individual strands are tensioned and released during the movement of the tensioning arm in one direction; and Fig. 6 is a similar view illustrating one step in the movement of the tensioning arm in the opposite direction.

Referring to the drawing a coil of rope 1 is placed on a rotating table or support 2 and the end of the rope is led between feeding rolls 3 and a guide ring 4. By providing a rotating support for the rope, the elimination of a twisting of the rope between the support and the rolls 3 and guide ring 4 is prevented. The movements of the rolls 3 and support 2 are synchronized by having them connected to a common motor 5 whose shaft 6 is provided with a bevel gear 7. An extension of the shaft 6 is carried through a bearing 8 and terminates in a worm gear 9. The worm gear 9 meshes with a complementary gear 9a on a supporting shaft 10 for the table 2. The gear ratio may be varied to give the desired speed of rotation to the table 2.

The rolls 3 are driven through a bevel gear 11 meshing with the gear 7, a shaft 12 carried by bearings 13 and bevel gears 14 and 15. A gear 15 is provided for each roll 3. The rolls 3 are supported on shafts 16 which are in turn mounted in a suitable frame 17. Preferably the frame 17 also carried the bearings 13. By varying the several gear ratios, the desired relative speed of rotation of the table 2 to the feed rolls 3, is synchronized in order to avoid twisting of the rope between the table 2 and the rolls 3. A feeding guide 18 may be mounted below the rolls 3 is desired.

The guide ring 4 holds the strands or threads of the rope in substantially their initial relation until they have passed therethrough.

For separating the individual strands of the rope 1, there is provided a spreader 19 disposed at a sufficient distance from the ring 4 to permit a fanning out or separation of the individual strands 20 between it and the ring 4. By making the spreader 19 of circular form and by providing individual guides 21, such as pigtails, for each of the strands, the strands assume a conical shape and each one is placed under substantially the same tension and is equally spaced.

For imparting motion to the strands 20 and for collecting them in a separated condition after leaving the spreader 19, I provide a pair of elongated pinch rolls 22 and 24. The pinch roll 24 is provided with a resilient bearing 25 for insuring uniform contact between it and the roll 22. The roll 22 is driven by a bevel gear 26 which meshes with a bevel gear 27 carried by a shaft 28. The shaft 28 is supported by a bearing 29 and terminates in a bevel gear 30. The bevel gear 30 in turn meshes with a gear 31 on a shaft 32 extending through bearings 34. The lower end of the shaft 32 is provided with a bevel gear 35 meshing with a bevel gear 36 on a stub shaft 37 carried by bearings 38. The shaft 37 terminates in a bevel gear 39 meshing with a bevel gear 40 on the shaft of the motor 5. By adjusting the gear ratios in the gear train just traced, the roll 22 is driven in synchronism with the rolls 3 and table 2. The setting of the rolls 22 and 24 is such as to insure a frictional engagement therebetween to tension the strands 20 and cause their gradual movement from the guide 4 past the spreader 19. From the roll 22 the individual strands 20 are carried to any suitable reeling or storing device (not shown).

In order to insure a uniform separation of the strands 20 after leaving the guide ring 4 and for breaking down any cohesion therebetween, I provide means for periodically applying excess tension to the strands and for relieving them. Where this feature is applied to the separation of resilient strands, such as rubber and/or rubber composition strands, the excess tension slightly stretches the strands which are suddenly released to permit them to snap back into their normal position in the cone formed between the ring 4 and the spreader 19. The alternate tensioning and releasing of the strands sets up a vibratory movement which is very effective in producing their separation. It is to be understood that this feature of the invention is not necessarily limited to rubber and/or rubber composition strands, as it may be used in the separation of other classes of strands.

For accomplishing this purpose, I provide a pivotally mounted arm 42 which extends through a slot 44 in a bar 45. The bar 45 is supported in bearings 46. As shown in Figs. 3 to 6 inclusive, the slot 44 is shaped to limit the swinging movement of the arm 42 during the reciprocations of the bar 45. The bar 45 is reciprocated to cause the arm 42 to engage, tension, and release all of the strands 20 during each of its movements in either direction. For reciprocating the bar 45, I provide a cam 47 which cooperates with a cam follower 48 on the bar. The cam is rotated by a gear train 49 which is driven from a bevel gear 50 on the shaft 32. Accordingly, the bar 45 is reciprocated in synchronism with the motion of the rolls 3, the table 2 and the rolls 22 and 24.

Referring particularly to Figs. 3 to 5, there is illustrated the manner in which the arm 42 affects the tensioning and release of the strands 20. In Fig. 3, the positions of the strands 20 at the plane of the arm 42 within the cone formed between the ring 4 and spreader 19, is shown. The arm 42 does not engage the cone. In Fig. 4, the arm 42 has advanced to the right far enough to deflect substantially half of the strands by carrying them along the advancing face of the arm. The forward motion of the strands serves to tension them in excess of the tension required for moving them toward the pinching rolls 22 and 24. As the strands are tensioned, they slide along the surface of the arm 42 and over its end. As shown in Fig. 4, the strands snap back into their position in the developed cone upon their escape from the end of the arm 42. This tensioning and snapping action sets up the vibrations in the strands for breaking down cohesion therebetween. In Fig. 5, the arm 42 is shown as having advanced far enough to have released most of the strands. In Fig. 6 the initial relative positions of the strands 20 and arm 42 are shown during the reverse movement of the arm 42. In the case of elastic strands, such as rubber or rubber composition strands, their inherent elasticity contributes to the effectiveness of the vibratory motion set up upon their release from the arm.

The term "rope" as used in the specification and claims includes a length of substantially untwisted cords which are more or less in bundle form.

While I have shown and described a present preferred embodiment of apparatus for practicing the invention, it is to be understood that the use of other methods and apparatus are contemplated within the spirit of the invention and the scope of the appended claims.

Having thus described my invention, what I claim and desire to protect by Letters Patent is:

1. A device for separating the strands of a rope comprising a support for the rope, said support being movable as the rope is fed therefrom to prevent twisting, guiding means for the rope, separate guiding means for individual strands of the rope, and means for agitating the strands to promote separation thereof while moving between the guiding means for the rope and for the separate strands.

2. A device for separating the strands of a rope comprising guiding means for the rope, separate guiding means for individual strands of the rope, and means for agitating the strands to promote separation thereof while moving between the guiding means for the rope and for the separate strands.

3. A device for separating the strands of a rope comprising guiding means for the rope, take-off means for the individual strands of the rope, and means for agitating the strands to promote their separation.

4. A device for separating the strands of a rope comprising guiding means for the rope, take-off means for the individual strands of the rope, and means for periodically agitating the strands to promote their separation.

5. A device for separating the strands of a rope comprising guiding means for the rope, take-off means for the individual strands of the rope, and means for periodically flexing the strands to promote their separation.

6. A device for separating the individual strands of a rope of elastic material comprising guiding means for the rope, take-off means for the several strands, and means for applying tension to the strands in excess of the tension required to maintain motion thereof and releasing such excess tension for assisting in a separation of the strands between the guiding means for the rope and the take-off means.

7. A device for separating the individual strands of a rope of elastic material comprising guiding means for the rope, take-off means for the several strands, and means for deflecting and releasing the individual strands of the rope adjacent to said rope guiding means whereby tension in excess of the tension required to maintain motion is applied to and removed from the strands to promote their separation.

8. A device for separating the strands of a rope comprising a reciprocating member adapted to engage and agitate the individual strands to assist their separation from a rope formation.

9. A device for separating the strands of a rubber rope comprising a reciprocating member adapted to engage and release the individual rubber strands thereby to alternately stretch them and permit them to snap for promoting their separation.

10. A device for separating the strands of a rubber rope comprising a member adapted to engage and release the individual rubber strands thereby to alternately stretch them and permit them to snap for promoting their separation.

11. A device for separating the strands of a rubber rope comprising feeding means for the rope, take-off means for the individual strands of the rope, means for periodically tensioning and releasing said strands to promote their separation, and means for driving the aforesaid means in synchronism.

12. A device for separating the strands of a rubber rope comprising feeding means for the rope, a guide for the rope, a spreader for the individual strands of the rope, take-off means for the strands, means for applying intermittent tension to the strands adjacent to said guide for promoting their separation, and means for driving the aforesaid means in synchronism.

13. A device for separating the strands of a rubber rope comprising feeding means for the rope, a guide ring for the rope, a spreader for causing the separated strands to assume a conical shape after leaving said guide, and means effective between said ring and spreader for agitating said threads to promote separation thereof adjacent said ring.

14. In the method of separating the strands of a rubber rope, the steps comprising spreading the strands from the end of the rope and agitating the strands to promote their separation at the rope end.

15. In the method of separating the strands of a rope of rubber strands, the steps comprising spreading the strands while moving from the rope end and periodically subjecting them to and releasing them from a tension in excess of the tension required to move them for promoting their separation at the rope end.

HAROLD T. BATTIN.